June 24, 1930. W. B. STOUT 1,767,488
CONVERTIBLE CHAIR
Original Filed July 11, 1924  3 Sheets-Sheet 1
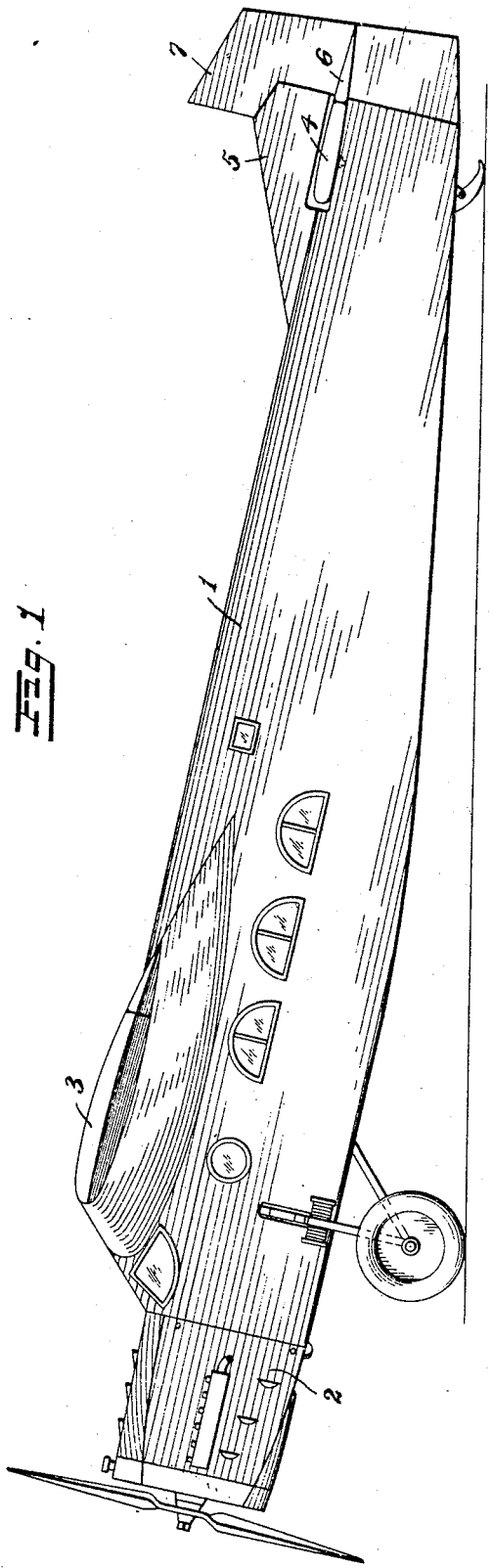
INVENTOR.
William B. Stout
BY
ATTORNEYS.

June 24, 1930.    W. B. STOUT    1,767,488
CONVERTIBLE CHAIR
Original Filed July 11, 1924    3 Sheets-Sheet 2
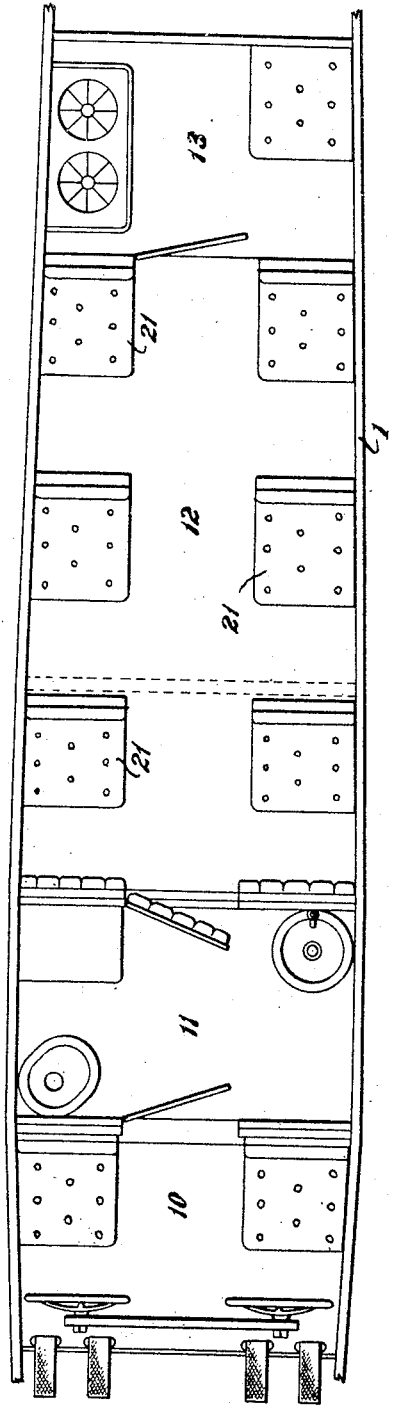
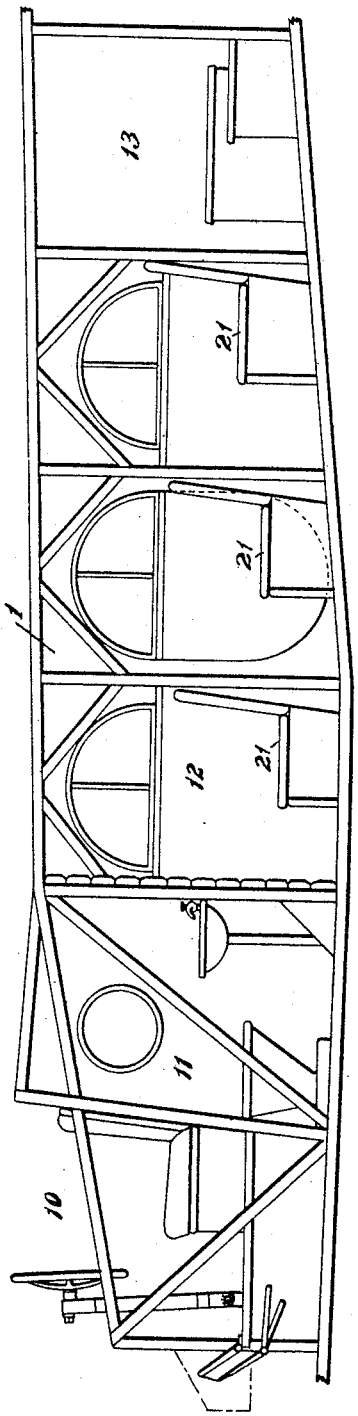
INVENTOR.
William B. Stout
BY
ATTORNEYS.

June 24, 1930.  W. B. STOUT  1,767,488
CONVERTIBLE CHAIR
Original Filed July 11, 1924   3 Sheets-Sheet 3
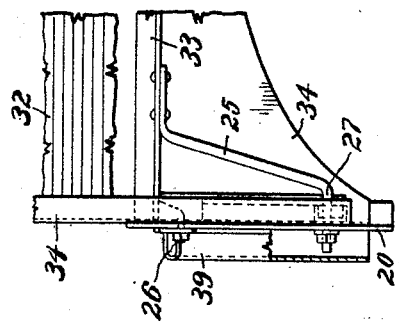
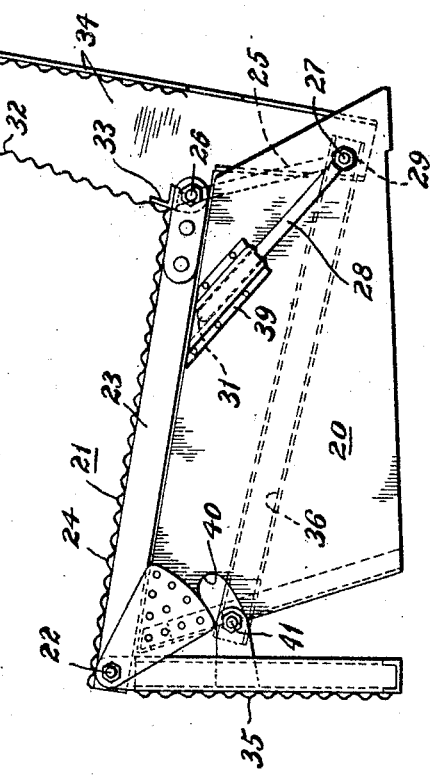
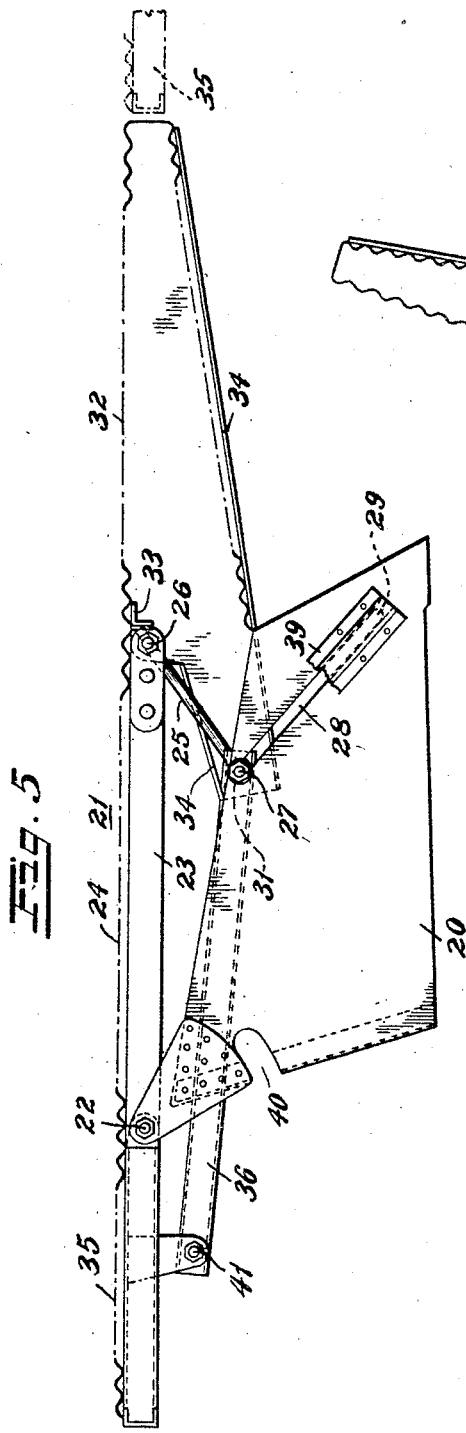
INVENTOR.
William B. Stout
BY
ATTORNEYS.

Patented June 24, 1930

1,767,488

UNITED STATES PATENT OFFICE

WILLIAM B. STOUT, OF DETROIT, MICHIGAN

CONVERTIBLE CHAIR

Original application filed July 11, 1924, Serial No. 42,944. Divided and this application filed October 5, 1926. Serial No. 139,593.

This invention relates to airplanes and more particularly to mechanism for rendering the airplane suitable for prolonged flights.

This application is a division of co-pending application, Serial No. 42,944, filed July 11, 1924.

The present invention relates primarily to the seating arrangement within the fuselage and the means whereby, within the space and weight available in an airplane, the seats may be converted into berths for sleeping purposes.

It is an object of the invention to provide a seat for use in aircraft and particularly in the fuselage of an airplane, which seat, in addition to affording maximum comfort, will occupy a minimum amount of space.

A further object is that of furnishing a device of the character described, the parts of which will be relatively few in number and individually rugged and simple in construction, these parts being assembled readily to provide a seat, the mechanism of which will operate over long periods of time with freedom from mechanical difficulty.

Further objects of the invention will appear hereinafter with reference to the specific embodiment thereof shown and described herein. This invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a side elevation of an airplane such as described in my co-pending application, and which is suitable for use with the invention hereinafter to be described.

Fig. 2 is a plan view of the central portion of the fuselage body, top being removed to show the seating arrangement;

Fig. 3 is a side elevation of the parts shown in Fig. 2, the side being similarly removed;

Fig. 4 is a side elevation of the seat mechanism when arranged as a seat;

Fig. 5 is a similar elevation of the same part when used as a berth, and

Fig. 6 is a detail at right angles to the plan of Fig. 4.

The airplane comprises in general a fuselage having a body section 1, a power compartment 2, and wing compartment 3, all of which parts are preferably made as separate units capable of being assembled into separate self-supporting units and arranged to be attached together to form a completed structure of stream line effect. Attached to the fuselage are horizontal and vertical stabilizer 4 and 5 with an elevator 6 and a rudder 7. The cabin section of the fuselage is made conveniently to be divided into a plurality of compartments, as for example, a pilot compartment 10, a toilet 11, lounge 12 and kitchenette 13.

It will be understood that the above description of the type of plane described in the aforesaid parent application, is intended as a suggestion as to the type of plane in which I prefer to use the seat hereinafter designed, although it will be obvious that the seat is not confined thereto.

The seat itself comprises a pair of side frames of a general shape and contour to support a seat portion 21 and to which the seat portion is pivoted at the front as shown at 22. This seat portion comprises a pair of lateral longitudinal members 23 to which is attached a corrugated metal covering 24, and it is supported at the rear by links 25 which are pivoted at one end 26 to the member 23 and having at the other end projections 27 adapted to slide in slots 28 in the frame 20. This slot is so designed that when projection or pin 27 is at either extreme of its travel, downward pressure upon the member 24 will retain the pin in position, as for example, as in the position shown in Fig. 4; downward pressure will cause pin 27 to tend to move downwardly toward the lower end 29 of the slot, whereas in the position shown in Fig. 5 further downward pressure upon the member 24 will attempt to force the pin 27 toward the left and hence cause it to engage the upper end 31 of the slot. The back comprises a corrugated sheet metal covering 32 attached to angle bar 33, which in turn is pivoted to the pivot 26, while a bracket 34 also attached to the member 32 engages the link 25 at the pin 27. This bracket is so arranged that as the pin traverses the center slot 28 the members 24 and 32 assume a horizontal position with the projection 27 locked in the upper portion of the slot.

At the front of the seat is a portion 35 also pivoted about the pivot 22 and movable from a horizontal position in alignment with and as an extension to the members 24 and 32 downwardly to a vertical position, and this member 35 is connected to the projection 27 by link 36 of such construction and so pivoted that as the member 35 is raised to horizontal, the pin 27 is drawn upwardly to the top of the slot. A guide 39 may be furnished upon the frame 20, completely to conceal the projection 27 and the slot in which it moves, while the frame may be cut out as at 40 to provide room for the pivotal connection 41 between the link 36 and the member 35.

With the aforesaid construction the seat may be converted into a bunk or berth solely by raising the member 35 about its pivot. This action will draw the projection 27 upwardly in its slot until it reaches the upper extremity 31 of the slot 28, whereupon the leverage exerted upon links 25 due to the weight and position of the members 24, 32 and 35, will cause the arrangement to be held in horizontal position. By reason of the fact that the weight distributed upon the central portion with the berth made up, is far greater than the weight upon the foot portion, and by reason of the fact that with the foregoing construction the back can again be raised only by forcing the projection 27 downwardly in the slot against the action of gravity, it will be evident there is no tendency to collapse while occupied. As soon, however, as it is desired to restore the seat to sitting position, this may be accomplished by pressing downwardly upon the foot board 35 without pressing upon the members 24 and 32. This action tends to force the projection 27 toward the right, as shown in Fig. 5, slightly raising the pivot 26 until dead center has been passed, after which the seat will retain its position as shown in Fig. 4.

It would be obvious that suitable covering may be used upon the seat, either in the upright or horizontal position.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A device of the character described having seat, back and foot portions, a stationary support for one of the portions, a slot in the support, a link having one end pivotally secured to one of the portions, the other end being slidably fitted within the slot, said other end of the link being pivotally secured to another of the portions, and another link between said other end of said first link and the third portion.

2. A device of the character described having seat, back and foot portions pivotally connected to each other, a frame support for the seat portion, a slot in the frame, a link having one end attached to the seat portion and the other end attached to the back portion, said other end being slidable within the slot and means for moving said other end within the slot, whereby all said portions assume a horizontal position.

3. A combination seat and berth having a frame, a seat on the frame, a back portion and a foot portion pivoted to the seat, a slot in the frame, a link slidable within the slot and pivotally secured to the seat and back portion, and a lever between said link and the foot portion for moving the link from one end of the slot to the other end, the positioning of said link in one end causing the parts to assume a seat forming position, and the positioning of the link at the other end of the slot causing the parts to assume a berth forming position.

In testimony whereof I affix my signature.

WILLIAM B. STOUT.

CERTIFICATE OF CORRECTION.

Patent No. 1,767,488.            Granted June 24, 1930, to

WILLIAM B. STOUT.

It is hereby certified that the above numbered patent was erroneously issued to the inventor said "Stout", as owner of said invention, whereas said patent should have been issued to "Ford Motor Company, of Highland Park, Michigan", said company being assignee of the entire interest in said invention, as shown by the records of assignments in this office; and that the said Letters Patent should be read with this correction therein that the same may conform to the record of the case in the Patent Office.

Signed and sealed this 29th day of July, A. D. 1930.

(Seal)                                                Wm. A. Kinnan,
                                                   Acting Commissioner of Patents.